(12) United States Patent
Peek

(10) Patent No.: US 9,619,508 B2
(45) Date of Patent: Apr. 11, 2017

(54) SPECULATIVE BEGIN TRANSACTION

(75) Inventor: Daniel Nota Peek, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 1072 days.

(21) Appl. No.: 13/181,396

(22) Filed: Jul. 12, 2011

(65) Prior Publication Data
US 2013/0018988 A1    Jan. 17, 2013

(51) Int. Cl.
*G06F 17/30* (2006.01)
*H04L 12/24* (2006.01)

(52) U.S. Cl.
CPC ........ *G06F 17/30377* (2013.01); *G06F 17/30* (2013.01); *H04L 12/2407* (2013.01); *H04L 41/00* (2013.01); *H04L 41/024* (2013.01)

(58) Field of Classification Search
CPC ... H04L 41/024; H04L 12/2407; H04L 41/00; G06F 17/30; G06F 17/30377
See application file for complete search history.

(56) References Cited

U.S. PATENT DOCUMENTS

| | | | |
|---|---|---|---|
| 5,857,188 A | 1/1999 | Douglas | |
| 6,434,543 B1 | 8/2002 | Goldberg et al. | |
| 6,615,221 B2 * | 9/2003 | Warner et al. | 370/412 |
| 6,772,363 B2 * | 8/2004 | Pedone et al. | 714/4.3 |
| 6,801,919 B2 * | 10/2004 | Hunt et al. | |
| 7,206,805 B1 * | 4/2007 | McLaughlin, Jr. | 709/203 |
| 7,490,162 B1 | 2/2009 | Masters | |
| 7,702,739 B1 * | 4/2010 | Cheng et al. | 709/207 |
| 8,069,469 B1 | 11/2011 | Atieh et al. | |
| 8,280,881 B1 | 10/2012 | Zhou et al. | |
| 2003/0204593 A1 | 10/2003 | Brown et al. | |
| 2004/0215746 A1 | 10/2004 | McCanne et al. | |
| 2006/0053065 A1 | 3/2006 | Bowman et al. | |
| 2007/0061329 A1 | 3/2007 | Moutafov | |
| 2007/0226276 A1 | 9/2007 | Suzuki et al. | |
| 2007/0239713 A1 | 10/2007 | Leblang et al. | |
| 2008/0013702 A1 | 1/2008 | Melideo | |
| 2008/0033930 A1 | 2/2008 | Warren | |
| 2008/0320151 A1 | 12/2008 | McCanne et al. | |
| 2009/0138448 A1 | 5/2009 | Barsness et al. | |

(Continued)

OTHER PUBLICATIONS

Wester, et al., "Tolerating latency in replicated state machines through client speculation", NSDI '09: 6th USENIX Symposium on Networked Systems Design and Implementation, 2009, pp. 245-260, 2009.

(Continued)

*Primary Examiner* — Patrice Winder
*Assistant Examiner* — Angela Widhalm De Rodrig
(74) *Attorney, Agent, or Firm* — Baker Botts L.L.P.

(57) ABSTRACT

Speculative processing of begin transaction database messages may include receiving a begin transaction message from a database client, transmitting an acknowledgement of the begin transaction message to the database client prior to forwarding the begin transaction message to the database server, forwarding the begin transaction message to the database server, and receiving an acknowledgement of the begin transaction message from the database server. In some implementations, the acknowledgement of the begin transaction message to the database client is transmitted substantially without delay after receiving the begin transaction message from the database client.

20 Claims, 5 Drawing Sheets

(56) References Cited

U.S. PATENT DOCUMENTS

| | | |
|---|---|---|
| 2009/0216718 A1 | 8/2009 | Agrawal et al. |
| 2010/0185649 A1 | 7/2010 | Zhou et al. |
| 2010/0217793 A1 | 8/2010 | Preiss |
| 2012/0254155 A1 | 10/2012 | Heim et al. |

OTHER PUBLICATIONS

Nightingale, et al., "Rethink the Sync", 14 pages.
USPTO Non-Final Office Action for U.S. Appl. No. 13/181,405, 9 pages, Sep. 9, 2013.
USPTO Final Office Action for U.S. Appl. No. 13/181,416, 12 pages, Sep. 11, 2013.
USPTO Final Office Action for U.S. Appl. No. 13/181,388, 22 pages, Sep. 20, 2013.
Nightingale, et al. "Spectulative Execution in a Distributed File System", 15 pages, Oct. 26, 2005.
USPTO, Office Action, U.S. Appl. No. 13/181,388, filed Jul. 12, 2011, in re: Daniel Nota Peek; (20 pgs), Apr. 18, 2013.
USPTO, Office Action, U.S. Appl. No. 13/181,416, filed Jul. 12, 2011, in re: Daniel Nota Peek; (22 pgs), Apr. 1, 2013.
USPTO, Office Action, U.S. Appl. No. 13/181,388, filed Jul. 12, 2011, in re: Daniel Nota Peek ; (23 pgs), Jun. 13, 2013.

\* cited by examiner

SPECULATIVE BEGIN TRANSACTION

TECHNICAL FIELD

The present disclosure generally relates to databases and, more particularly, to speculative processing of begin transaction database messages.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view web pages created or customized by other users where visibility and interaction with such pages by other users is governed by some characteristic set of rules.

Such social networking information, and most information in general, is typically stored in relational databases. Generally, a relational database is a collection of relations (frequently referred to as tables). Relational databases use a set of mathematical terms, which may use Structured Query Language (SQL) database terminology. For example, a relation may be defined as a set of tuples that have the same attributes. A tuple usually represents an object and information about that object. A relation is usually described as a table, which is organized into rows and columns. Generally, all the data referenced by an attribute are in the same domain and conform to the same constraints.

The relational model specifies that the tuples of a relation have no specific order and that the tuples, in turn, impose no order on the attributes. Applications access data by specifying queries, which use operations to identify tuples, identify attributes, and to combine relations. Relations can be modified and new tuples can supply explicit values or be derived from a query. Similarly, queries may identify tuples for updating or deleting. It is necessary for each tuple of a relation to be uniquely identifiable by some combination (one or more) of its attribute values. This combination is referred to as the primary key. In a relational database, all data are stored and accessed via relations. Relations that store data are typically implemented with or referred to as tables.

Relational databases, as implemented in relational database management systems, have become a predominant choice for the storage of information in databases used for, for example, financial records, manufacturing and logistical information, personnel data, and other applications. As computer power has increased, the inefficiencies of relational databases, which made them impractical in earlier times, have been outweighed by their ease of use for conventional applications. The three leading open source implementations are MySQL, PostgreSQL, and SQLite. MySQL is a relational database management system (RDBMS) that runs as a server providing multi-user access to a number of databases. The "M" in the acronym of the popular LAMP software stack refers to MySQL. Its popularity for use with web applications is closely tied to the popularity of PHP (the "P" in LAMP). Several high-traffic web sites use MySQL for data storage and logging of user data.

Using databases involves a series of messages that enable a database user to interact with a database. For example, a database transaction may involve messaging associated with setting up connections to a database, authentication, querying the database, switching databases, committing transactions to the database, and terminating connections with the database.

SUMMARY

In accordance with the present disclosure, disadvantages and problems associated with processing of begin transaction database messages may be reduced or eliminated.

According to one embodiment, speculative processing of begin transaction database messages includes receiving a begin transaction message from a database client, transmitting an acknowledgement of the begin transaction message to the database client prior to forwarding the begin transaction message to the database server, forwarding the begin transaction message to the database server, and receiving an acknowledgement of the begin transaction message from the database server. In some implementations, the acknowledgement of the begin transaction message to the database client is transmitted substantially without delay after receiving the begin transaction message from the database client.

DESCRIPTION OF EXAMPLE EMBODIMENTS

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1A:
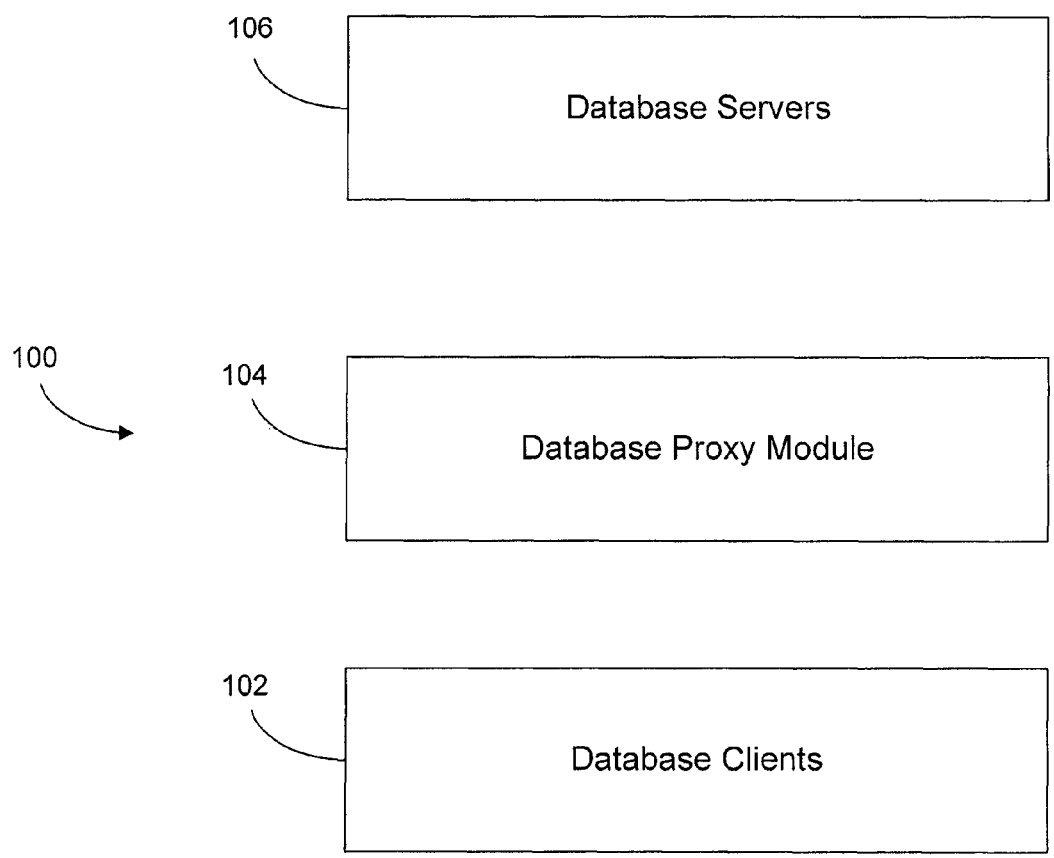
FIG. 1A illustrates example devices involved in a database transaction.

FIG. 1A illustrates a system 100 of example components involved in a database transaction. As illustrated, system 100 includes database clients 102, a database proxy module 104, and database servers 106. In appropriate environments, these components interoperate to facilitate database transactions between database clients 102 and a database server 106. For example, database clients 102 may transmit and receive messages from database server 106 using database proxy module 104, and thereby access, retrieve, and store information in a database residing on database server 106. The database proxy module 104 may facilitate and assist in the processing of database transactions between database clients 102 and database servers 106. In particular embodiments, database proxy module 104 is operable to speculatively process begin transaction messages intended for database servers 106.

Figure 1B:
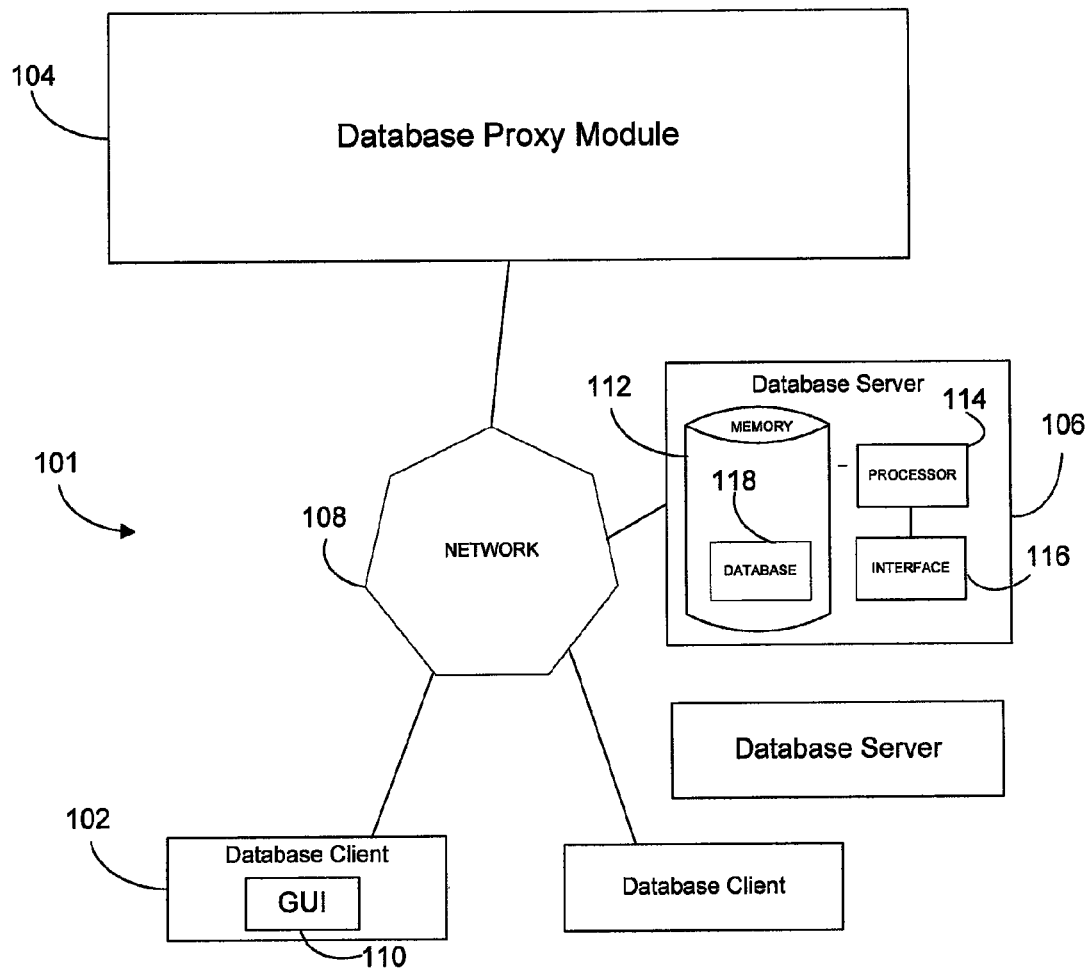
FIG. 1B illustrates an example database environment.

FIG. 1B illustrates a system 101 of an example database environment in which embodiments of the present disclosure may operate. In the illustrated embodiment, system 101 may speculatively acknowledge begin transaction messages. In particular embodiments, a begin transaction refers to the initial message of a series of messages intended for database servers 106, where the messages refer to data that relate to each other and the database, such that data used during a database connection is logically and physically consistent. A transaction may comprise a series of database operations or queries that occur between a begin transaction message and a commit transaction message. In particular embodiments, a database transaction may be rolled back, including any constituent operations or queries, if an error occurs or if a an explicit roll back is requested. Accordingly, at any point before database operations or queries corresponding to a database transaction are committed, the database transaction may be rolled back if an error condition occurs or if a roll back is requested.

Database clients 102 represent computer systems including appropriate hardware, control logic, and data that may be used to interface with other system components, such as database proxy module 104 or database servers 106, using network 108. For example, database clients 102 may represent web servers, mainframe computers, workstations, laptops, netbooks, tablet computers, personal data assistants, (PDAs), mobile phones, mainframes, and any other suitable computing device capable of interacting with a database using appropriate messaging and/or database transactions. Database clients 102 may support a wide array of operations, including but not limited to, web browsing, word processing, querying databases, and processing results retrieved from databases. According to particular embodiments, database clients 102 may provide access, potentially through web-based interfaces, to information managed by other elements such as database proxy module 104 and database servers 106. As illustrated, database clients 102 may include a graphical user interface 110. Graphical user interface 110 represents any appropriate interface for receiving and displaying information to a user of system 100. Graphical user interface 110 may be any appropriate combination of hardware and/or software to facilitate a user's interaction with database clients 102. In particular embodiments, database clients 102 are web servers that issue a series of database requests in order to deliver web pages to requesting network users. For example, a social networking user may request that a web server deliver a web page associated with another social networking user. In such an example, the web server may issue a number of database queries to populate the requested web page with relevant information. In some embodiments, the database queries issued by database clients 102 may be preceded by a begin transaction message to database servers 106. In those instances, the begin transaction message may be speculatively processed according to embodiments of the present disclosure.

Network 108 represents any suitable communications network operable to facilitate communication between the components of system 101, such as database clients 102, database servers 106, and database proxy module 104. Network 108 may include any interconnecting system capable of transmitting audio/video signals, data, messages or any other combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between components of system 101. Network 108 may include any combination of gateways, routers, hubs, switches, access points, base stations, wireless telephone systems and any other hardware, software or combination thereof.

Database proxy module 104 represents suitable hardware components, control logic, and data for processing database transactions to and from database servers 106 and database clients 102. As illustrated, database proxy module 104 may be communicatively coupled to other components of system 101, such as database servers 106 and database clients 102, by a network 108. Database proxy module 104 may receive being transaction messages from database clients 102, speculatively acknowledge the begin transaction, forward the begin transaction to a particular database server 106, receive database queries from database clients 102, collect the results from each query, and forward the results to appropriate database clients 102. In particular embodiments, database proxy module 104 may be operable to speculatively process and acknowledge begin transaction messages from database clients 102. Database proxy module 104 will be discussed in further detail in FIG. 2.

Database servers 106 represent suitable hardware components, control logic, and data for managing information in one or more databases. For example, database servers 106 may be any suitable combination of computer servers and networking devices, whether real or virtual. In particular embodiments, database servers 106 may manage data associated with a social networking website. For example, database servers 106 may manage data corresponding to users of a social networking website in the form of text, audio, video, and images. Database servers 106 may also retain information including configurations, settings, rules and policies associated with the managed data and/or particular users or groups. Database servers 106 may employ one or more relational databases for storing various types of information in a manner that is accessible and easily retrievable upon request. In certain embodiments, database servers 106 are operable to perform speculative begin transaction processing.

As illustrated, database servers 106 may include various interconnected elements including a memory 112, a processor 114, and an interface 116. Memory 112 represents any suitable combination of volatile or non-volatile, local or remote devices suitable for storing information. For example, memory 112 may include random access memory (RAM), read only memory (ROM), magnetic storage devices, optical storage devices, or any other suitable information storage device or a combination of such devices. Memory 112 may maintain appropriate control logic and rules for controlling the operation of database servers 106. As illustrated, memory 112 may include a database 118 for storing and organizing various types of data. In particular embodiments, database 118 represents a relational database for storing information, such as social networking information, in an easily retrievable format. For example, database 118 may represent a SQL database for storing various types of information.

Processor 114 represents any hardware and/or software that communicatively couples to memory 112 and interface 116, and controls the operation and administration of database servers 106. For example, processor 114 may execute appropriate software to control the operation of database servers 106. Processor 114 may be a programmable logic device, a microcontroller, a microprocessor, any other appropriate processing device, or any suitable combination of the preceding.

Interface 116 represents any suitable device operable to receive information from network 108, transmit information through network 108, perform processing of received or transmitted information, communicate to other devices or any combination of the preceding. Interface 116 represents any port or connection, real or virtual including any suitable hardware and/or software including protocol conversion and data processing capabilities to communicate through a LAN, WAN or other communication systems that allow database servers 106 to exchange information with network 108, database clients 102 and database proxy module 104. For example, interface 116 may receive requests for database transactions associated with database 118 from database clients 102. According to particular embodiments, interface 116 may receive database queries from database clients 102 and/or database proxy module 104, for appropriate processing by processor 114 of the information stored in database 118 of memory 112.

In certain embodiments, database proxy module 104 maintains a pool of database connections between itself and one or more database servers located at one or more database servers 106. According to particular implementations, the database connections may be in an active or idle states with respect to particular databases at database servers 106. In particular embodiments, database proxy module 104 may harness a pool of database connections, as appropriate, to process and respond to database transactions received from database clients 102. For example, database proxy module 104 may multiplex database transactions received from different database clients 104 onto a particular database connection selected from the pool of database connections existing between database proxy module 104 and database servers 106. Thus, particular embodiments of the present disclosure facilitate using database connection pooling to improve the performance of database transactions.

In exemplary embodiments, database proxy module 104 receives begin transaction messages from database clients 102, speculatively processes the begin transaction messages by responding to begin transaction messages without substantial delay, receive database queries from database clients 102, forward the database queries to database servers 106, receive database results from database servers 106, and forward those database results to the appropriate database clients 102. In order to process speculatively process begin transaction messages, certain embodiments may determine whether a begin transaction acknowledgement message has been received from the database servers 106 before the database proxy module forward a database query from a database client 102 to database server 106. Accordingly, database clients 102, database proxy module 104, and database servers 106 may work in conjunction to speculatively process begin transaction messages, thereby conserving computing resources and minimizing transaction delays.

A component of systems 100 and 101 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and 101 and the components within systems 100 and 101.

While systems 100 and 101 are illustrated as including specific components arranged in a particular manner, it should be understood that various embodiments may operate using any suitable arrangement and collection of components capable of performing functionality such as that described. For example, a database server 106 may also be database proxy module 104.

Figure 2:
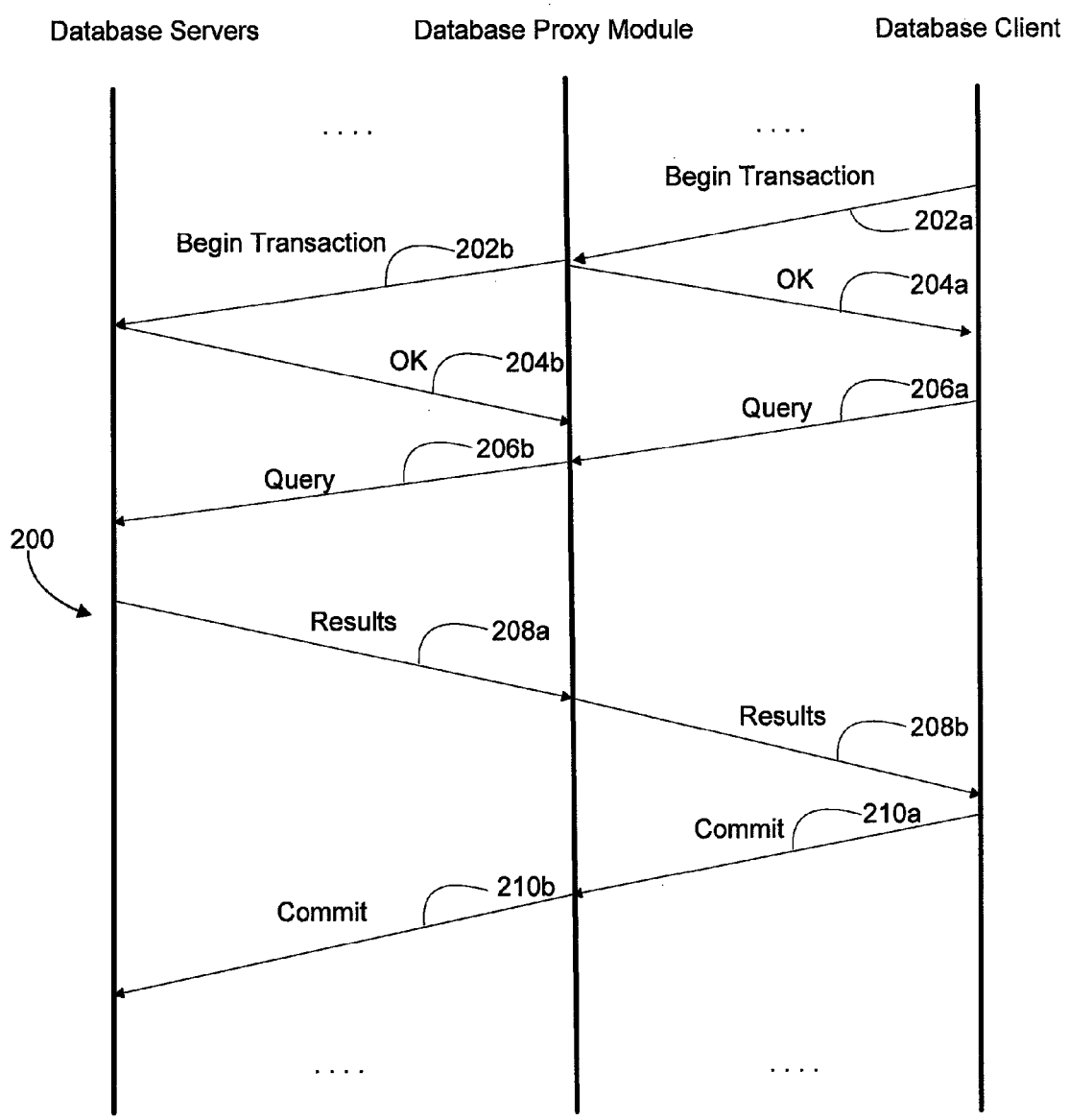
FIG. 2 illustrates a messaging sequence of an example embodiment.

FIG. 2 illustrates a schematic diagram of example messaging sequence 200 between database clients 102, database proxy 104 and database servers 106. As illustrated, database clients 102 may initiate a database transaction by issuing a specific database begin transaction 202a to database proxy module 104. A begin transaction represents the beginning of series of messages intended for database servers 106 and relates to data used during a database connection that is logically and physically consistent. For example, following a begin transaction 202, database clients 102 may issue any number of database transactions such as queries, reads, writes, and any other transactions that may modify content residing on database servers 106. If any errors occur during this process, each of those modifications can be rolled back such that the content residing a database server 106 is reverted back to the state it was in before the transaction began, such as, when the begin transaction message 202 was received.

In particular embodiments, all database transactions taking place between begin transaction message 202 and commit message 210 may be undone, as and when necessary or when an error occurs. Modifications taking place to content on database servers 106 due to database transactions occurring between begin transaction message 202 and commit message 210 may not be finalized until database server 106 receives the commit message 210. Therefore, in particular embodiments, begin transaction message 202 represents the beginning and the commit transaction 210 represents the end of a series of database transactions that may be rolled back as the need arises during a database session.

In response to receiving the begin transaction message 202a, database proxy module 104 may respond with a begin transaction acknowledgement message 204a. In certain embodiments, database proxy module 104 may transmit the begin transaction acknowledgment message 204a unconditionally, without substantial processing. For example, in certain embodiments, database proxy module 104 transmits the begin transaction acknowledgment message 204a before receiving the begin transaction acknowledgment message 204b from data servers 106. In addition to immediately responding to database clients 102's begin transaction message 202a, database proxy module 104 may issue a begin transaction message 202b corresponding to begin transaction message 202a to database servers 106.

In response to begin transaction message 202b, database servers 106 may process the message and respond by transmitting a begin transaction acknowledgment message 204b to database proxy module 104. As discussed above, in particular embodiments, database clients 102 may receive begin transaction acknowledgment message 204a from database proxy module 104 before database proxy module 104 receives begin transaction acknowledging message 204b from data servers 106. In such embodiments, this speculative acknowledgment of the begin transaction enables database clients 102 develop subsequent queries 206 for transmission to database proxy module 104 and database server 106 while database servers 106 is processing the begin transaction message 202b. While messaging sequence 200 illustrates facilitating the expedited development of database queries, other database transaction messages may also be developed. As shown, database clients 102 may issue any number of queries 206 to database proxy module 104, for forwarding by database proxy module 104 to database servers 106. Database proxy module 104 may receive a query 206a and forward that query as query message 206b to database servers 106. In response, database servers 106, after appropriate processing, may return database results in database results message 208a to database proxy module 104 for subsequent forwarding to database clients 102 in database results message 208b. While only one database query and the return of results corresponding to that query are shown in messaging sequence 200, certain embodiments may involve multiple database queries and responses. Other embodiments may include any number of other database transactions intended for database servers 106. Once database client 102 is satisfied with its database transactions, database client 102 may transmit a commit message 210a to database proxy module 104 for forwarding by database proxy module 104 to database servers 106 in order to finalize any database modifications. In particular embodiments, once database servers 106 receives a commit message 210, database servers 106 may finalize all data modifications to the content residing in databases on database servers 106, such as database 118.

While messaging sequence 200 is illustrated as including specific messages, it should be understood that various embodiments may operate using any suitable arrangement and collection of messages.

Figure 3:
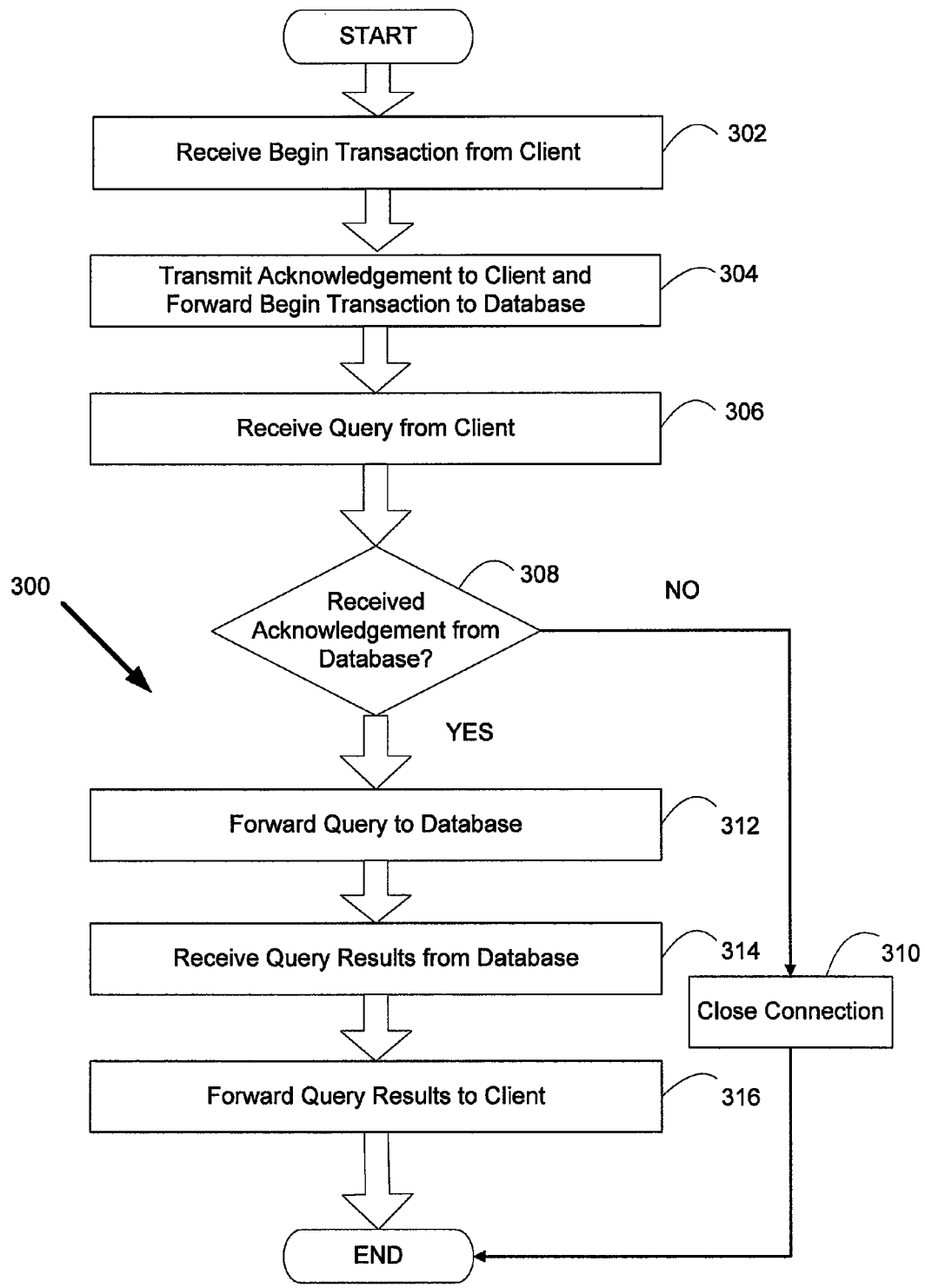
FIG. 3 illustrates a flowchart of an example embodiment.

FIG. 3 illustrates a flow chart of example process flow 300 for speculatively transmitting begin transaction acknowledgment messages. As illustrated, process flow 300 begins at step 302 when database proxy module 104 receives a begin transaction message from database client 102. Next, at step 304, database proxy module 104 transmits an acknowledgment to database client 102 and forwards a begin transaction message to the database servers 106. As discussed above, in particular embodiments, database proxy module 104 may transmit the begin transaction acknowledgment message to database clients 102 without substantial delay. For example, database proxy module 104 may transmit a begin transaction acknowledgment message to database clients 102 without considerable processing after the begin transaction message is received in step 302. In certain embodiments, this immediate response by the database proxy module 104 facilitates database client 102's formation of subsequent database transactions, such as database queries, while the begin transaction message is processed by database proxy module 104 and/or database servers 106.

For example, database proxy module 104 may receive a database query from database client 102 at step 306. Database proxy module 104 may then determine, at step 308, whether it has received a begin transaction acknowledgment message from database server 106. If database proxy module 104 has not received a begin transaction acknowledgment, database proxy module may immediately close the connection at step 310, thereby ending process flow 300. If, however, database proxy module 104 receives a begin transaction acknowledgment message from database server 106, database proxy module 104 forwards the database query received from database clients 102 in step 306 to the database server 106. After the database query is processed, database proxy module 104 may receive the database query results from database servers 106 in step 314. In turn, database proxy module 104 may forward the database query results to database clients 106 in step 316, thereby ending process 300.

As demonstrated by process 300, particular embodiments of the present disclosure may facilitate development of database transactions, such as database queries, at database client 102 while a begin transaction message is processed by database proxy module 104 and/or database servers 106. While process 300 is illustrated as including specific steps arranged in a particular sequence, it should be understood that various embodiments may be operated using any suitable arrangement and collection of steps.

Figure 4:
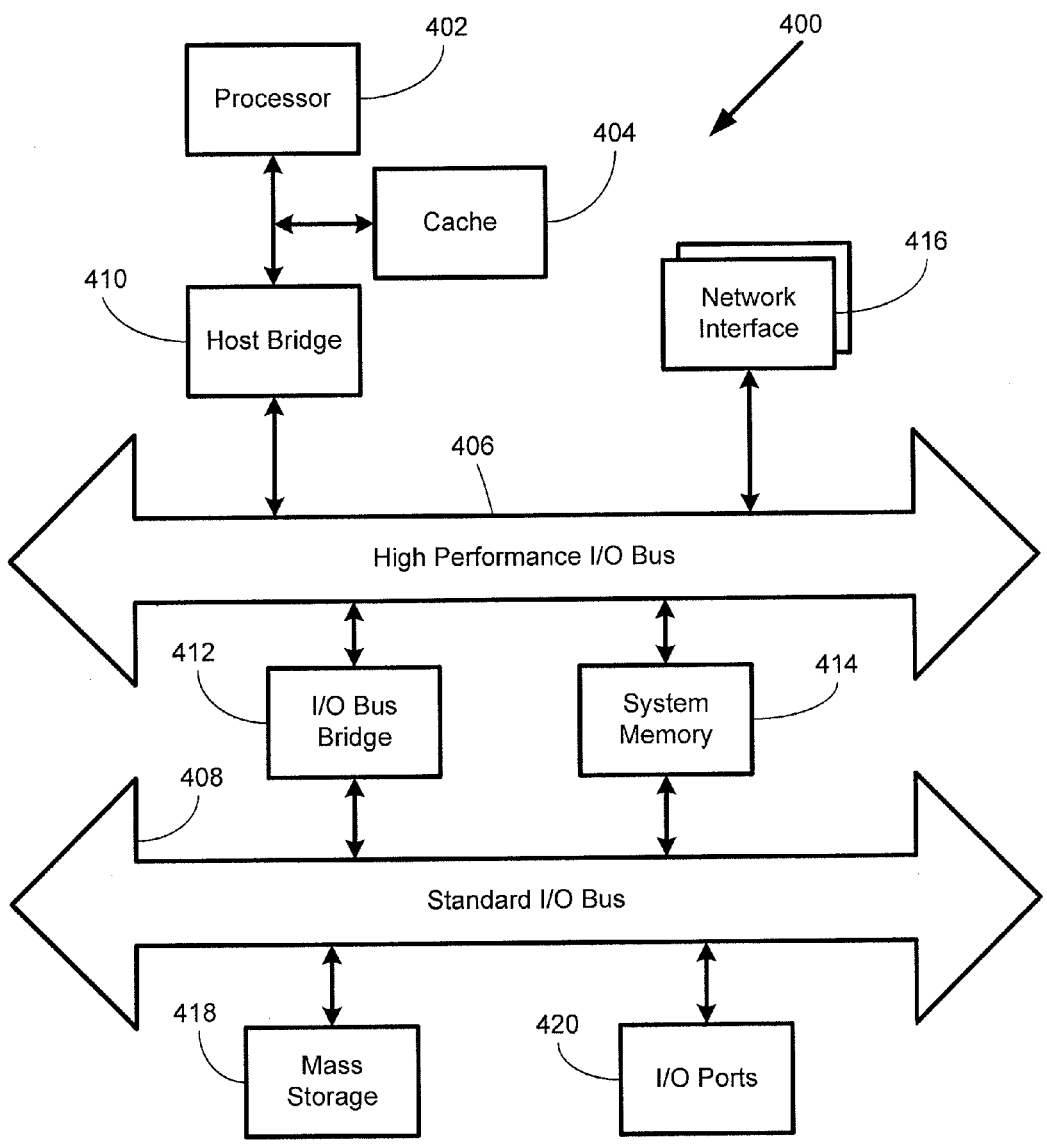
FIG. 4 illustrates an example computer system.

FIG. 4 illustrates an example computer system 400. In particular embodiments, computer system 400 is a computer server that runs all or part of a functionality related to a system for speculating begin transactions. In particular embodiments, computer system 400 may represent the hardware architecture of database clients 102, database proxy module 104, and/or database servers 106. In one embodiment, hardware system 400 includes a processor 402, a cache memory 404, and one or more software applications and drivers directed to the functions described herein. Additionally, hardware system 400 includes a high performance input/output (I/O) bus 406 and a standard I/O bus 408. A host bridge 410 couples processor 402 to high performance I/O bus 406, whereas I/O bus bridge 412 couples the two buses 406 and 408 to each other. A system memory 414 and a network/communication interface 416 couple to bus 406. Hardware system 400 may further include video memory (not shown) and a display device coupled to the video memory. Mass storage 418 and I/O ports 420 couple to bus 408. In one embodiment, hardware system 400 may also include a keyboard and pointing device 422 and a display 424 coupled to bus 408. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 400 are described in greater detail below. In particular, network interface 416 provides communication between hardware system 400 and any of a wide range of networks, such as an Ethernet (e.g., IEEE 802.3) network. Mass storage 418 provides permanent storage for the data and programming instructions to perform the functions described herein, whereas system memory 414 (e.g., DRAM) provides temporary storage for the data and programming instructions when executed by processor 402. I/O ports 420 are one or more serial and/or parallel communication ports that provide communication between additional peripheral devices, which may be coupled to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain embodiments of the present disclosure may not require nor include all of the above components. For example, the peripheral devices shown coupled to standard I/O bus 408 may couple to high performance I/O bus 406. In addition, in some embodiments only a single bus may exist with the components of hardware system 400 being coupled to the single bus. Furthermore, hardware system 400 may include additional components, such as additional processors, storage devices, or memories.

In particular embodiments, the speculative begin transaction processing system, as well as other computer-implemented operations described herein includes a series of software routines run by hardware system 400. These software routines include a plurality or series of instructions to be executed by a processor in a hardware system, such as processor 402. Initially, the series of instructions are stored on a storage device, such as mass storage 418. However, the series of instructions can be stored on any suitable storage medium, such as a diskette, CD-ROM, ROM, or EEPROM. Furthermore, the series of instructions need not be stored locally, and could be received from a remote storage device, such as a server on a network, via network/communication interface 416. The instructions are copied from the storage device, such as mass storage 418, into memory 414 and then accessed and executed by processor 402.

An operating system manages and controls the operation of hardware system 400, including the input and output of data to and from software applications (not shown). The operating system provides an interface between the software applications being executed on the system and the hardware components of the system. According to one embodiment of the present disclosure, the operating system is the LINUX operating system. However, embodiments of the present disclosure may be used with other suitable operating systems, such as the Windows® 95/98/NT/XP/Vista/7 operating system, available from Microsoft Corporation of Redmond, Wash., the Apple Macintosh Operating System, available from Apple Computer Inc. of Cupertino, Calif., UNIX operating systems, and the like.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A non-transitory computer readable medium comprising instructions, the instructions operable when executed by a processor to:
receive a begin transaction message from a database client, wherein the begin transaction is the first in a series of logically related messages sent to a database server;
transmit an acknowledgement of the begin transaction message to the database client, prior to forwarding the begin transaction message to the database server, the begin transaction message establishing an active connection to the database server;
forward the begin transaction message to the database server; and
receive an acknowledgement of the begin transaction message from the database server.

2. The non-transitory computer readable medium of claim 1, wherein the acknowledgement of the begin transaction message to the database client is transmitted substantially without delay after receiving the begin transaction message from the database client.

3. The non-transitory computer readable medium of claim 1, wherein the instructions are further operable when executed by the processor to:
receive a database query from the database client;
if the acknowledgement of the begin transaction message from the database server is received, forward the database query to the database server.

4. The non-transitory computer readable medium of claim 3, wherein the instructions are further operable when executed by the processor to:
receive, from the database server, database results in response to the database query;
forward the database results to the database client.

5. The non-transitory computer readable medium claim of claim 3, wherein the instructions are further operable when executed by the processor to, if the acknowledgement of the begin transaction message from the database server is not received, terminate the connection with the database client.

6. The non-transitory computer readable medium of claim 1, wherein the database client is a web server.

7. The non-transitory computer readable medium of claim 1, wherein the database server is a Structured Query Language (SQL) database.

8. A apparatus, comprising:
an interface for receiving begin transaction messages;
a memory for storing begin transaction messages;
a processor communicatively coupled to the interface and the memory, the processor operable to:
receive a begin transaction message from a database client, wherein the begin transaction is the first in a series of logically related messages sent to a database server;
transmit an acknowledgement of the begin transaction message to the database client, prior to forwarding the begin transaction message to the database server, the begin transaction message establishing an active connection to the database server;
forward the begin transaction message to the database server; and
receive an acknowledgement of the begin transaction message from the database server.

9. The apparatus of claim 8, wherein the acknowledgement of the begin transaction message to the database client is transmitted substantially without delay after receiving the begin transaction message from the database client.

10. The apparatus of claim 8, wherein the processor is further operable to:
receive a database query from the database client;
if the acknowledgement of the begin transaction message from the database server is received, forward the database query to the database server.

11. The apparatus of claim 10, wherein the processor is further operable to:
receive, from the database server, database results in response to the database query;
forward the database results to the database client.

12. The apparatus of claim 10, wherein the processor is further operable to, if the acknowledgement of the begin transaction message from the database server is not received, terminate the connection with the database client.

13. The apparatus of claim 8, wherein the database client is a web server.

14. The apparatus of claim 8, wherein the database server is a Structured Query Language (SQL) database.

15. A method, comprising:
    receiving a begin transaction message from a database client, wherein the begin transaction is the first in a series of logically related messages sent to a database server;
    transmitting an acknowledgement of the begin transaction message to the database client, prior to forwarding the begin transaction message to the database server, the begin transaction message establishing an active connection to the database server;
    forwarding the begin transaction message to the database server; and
    receiving an acknowledgement of the begin transaction message from the database server.

16. The method of claim 15, wherein the acknowledgement of the begin transaction message to the database client is transmitted substantially without delay after receiving the begin transaction message from the database client.

17. The method of claim 15, wherein the instructions are further operable when executed by the processor to:
    receive a database query from the database client;
    if the acknowledgement of the begin transaction message from the database server is received, forward the database query to the database server.

18. The method of claim 17, further comprising:
    receiving, from the database server; database results in response to the database query;
    forwarding the database results to the database client.

19. The method of claim 17, further comprising if the acknowledgement of the begin transaction message from the database server is not received, terminating the connection with the database client.

20. The method of claim 15, wherein the database client is a web server.

* * * * *